(12) United States Patent
Maiolani et al.

(10) Patent No.: US 10,108,364 B2
(45) Date of Patent: Oct. 23, 2018

(54) IC MODULE AND METHOD OF DECODING RESOURCE ACCESS REQUESTS

(71) Applicant: Freescale Semiconductor, Inc., Austin, TX (US)

(72) Inventors: Mark Maiolani, Glasgow (GB); Derek James Beattie, Glasgow (GB); Robert Freddie Moran, North Ayrshire (GB)

(73) Assignee: NXP USA, Inc., Austin, TX (US)

( * ) Notice: Subject to any disclaimer, the term of this patent is extended or adjusted under 35 U.S.C. 154(b) by 272 days.

(21) Appl. No.: 14/752,216

(22) Filed: Jun. 26, 2015

(65) Prior Publication Data

US 2016/0378393 A1    Dec. 29, 2016

(51) Int. Cl.
*G06F 12/02* (2006.01)
*G06F 3/06* (2006.01)

(52) U.S. Cl.
CPC .......... *G06F 3/0638* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 7,649,795 | B2 | 1/2010 | Kim et al. |
| 8,738,860 | B1* | 5/2014 | Griffin ................ G06F 12/0897 |
| | | | 711/122 |
| 2006/0117367 | A1 | 6/2006 | Lyle |
| 2010/0280786 | A1* | 11/2010 | Gorbold ............. G06F 13/4247 |
| | | | 702/120 |
| 2012/0089721 | A1 | 4/2012 | Day |
| 2016/0180891 | A1* | 6/2016 | Moran .................. H01L 23/528 |
| | | | 365/51 |

FOREIGN PATENT DOCUMENTS

CN    100517267 C    7/2009

* cited by examiner

*Primary Examiner* — Charles Rones
*Assistant Examiner* — Ryan Dare

(57) ABSTRACT

An integrated circuit (IC) module comprising at least one memory mapped resource, at least one port arranged to be coupled to a further IC module, and an address decoding component. Upon receipt of a resource access request by the IC module, the address decoding component is arranged to extract at least one position parameter from an address field of the received resource access request, determine if the at least one position parameter indicates a target resource as residing within the IC module, and if it is determined that the at least one position parameter indicates the target resource as not residing within the IC module, modify the at least one position parameter to represent a change of one position and forward the resource access request with the modified position parameter over the port to the further IC module.

25 Claims, 7 Drawing Sheets

IC MODULE AND METHOD OF DECODING RESOURCE ACCESS REQUESTS

FIELD OF THE INVENTION

This invention relates to an integrated circuit module and a method of decoding resource access requests.

BACKGROUND OF THE INVENTION

In the field of integrated circuits, memory configurations may vary across a product family. For example, in an automotive instrument cluster family of products, high-end applications may require, for example, 8 MB of RAM (random access memory), while lower-end applications may require, for example, 1 MB of RAM. Conventionally, two approaches to providing different memory configurations across a product range have been used.

A first conventional approach involves 'phantoming' down the memory configuration from the high-end application to the lower-end applications, whereby unrequired memory is disabled for the lower-end applications. In this manner, only a single silicon mask set is created, but a lower gross margin is achievable for the lower-end products.

A second conventional approach is to create separate silicon mask sets for each required memory configuration. In this manner, an optimal, cost efficient memory configuration is achieved for the lower-end products. However, as the cost of new silicon mask sets is becoming an increasingly higher part of the overall product cost, the need to create new silicon mask sets for each individual product within a product range is becoming increasingly less desirable.

One example of addressing such a problem is to provide a semiconductor wafer consisting of a plurality of replicated integrated circuit (IC) modules having inter-module cross-wafer electrical connections, with the replicated IC modules being capable of being cut into IC dies consisting of multiple replicated IC modules. In this manner, IC dies consisting of different configurations of the replicated IC modules may be created from the semiconductor wafer based on where the semiconductor wafer is cut (sawn). Advantageously, such a semiconductor wafer is capable of providing IC dies for both high-end applications requiring functionality from multiple replicated IC modules, as well as for low-end applications requiring functionality from fewer (e.g. just one) replicated IC modules without having to resort to 'phantoming' the high-end application IC die configurations, and without having to create separate silicon mask sets for the differing application requirements.

In order to enable an external device to access the resources within such variably configurable replicated IC modules, one can use an adaptive means of addressing the individual replicated IC modules. However, standard addressing schemes require individual select lines to be routed to each mapped resource, adding significant cost and complexity to the inter-module cross-wafer electrical connections, or for each resource to be customised to respond to a unique address range, for example custom addresses being assigned using custom metal layers, fuses, non-volatile memory or other mechanisms that add cost and complexity to the replicated IC modules, or by way of custom addresses being allocated on system start-up that would add significant delay to the system start-up procedure.

SUMMARY OF THE INVENTION

The present invention provides an integrated circuit module, an integrated circuit device and a method of decoding resource access requests as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention provides an addressing and decoding scheme that allows an external bus master device to access memory mapped resources within an array of IC modules. Significantly, an addressing and decoding scheme provided by the present invention does not require any programming or customisation of the IC modules, and does not constrain the size of the IC module array. The addressing and decoding scheme is based on the use of relative addressing, where a position parameter within an address field is modified as it is forwarded through the array of IC modules.

Figure 1:
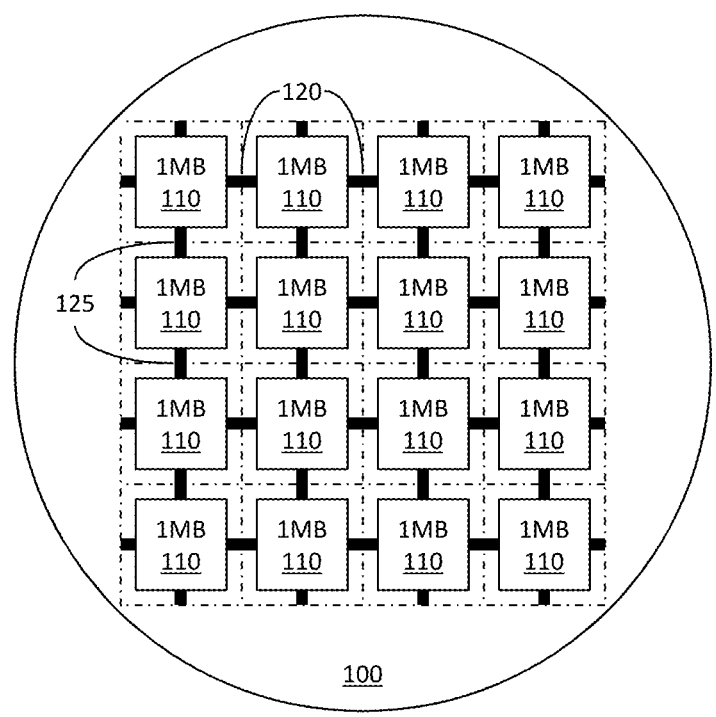
FIG. 1 schematically illustrates a simplified plan view of an example of a semiconductor wafer.

Referring now to FIG. 1, there is schematically illustrated a simplified plan view of an example of a semiconductor wafer 100. The semiconductor wafer 100 includes a plurality of replicated integrated circuit (IC) modules 110. Each replicated IC module 110 is capable of forming an individual IC die, and it is contemplated that in some examples the replicated IC modules 110 are substantially identical. The semiconductor wafer 100 further includes inter-module cross-wafer electrical connections, such as the inter-module cross-wafer electrical connections 120, 125 indicated in FIG. 1, enabling the replicated IC modules 110 to further be capable of forming IC dies consisting of multiple replicated IC modules 110 as described in greater detail below.

In some examples, the semiconductor wafer 100 may include scribe lines separating the replicated IC modules 110, such as illustrated by the broken lines in FIG. 1, with IC dies being singulated by cutting along appropriate scribe lines, and across the inter-module cross-wafer electrical connections 120, 125 crossing the scribe lines being cut along.

In the illustrated example, each replicated IC module 110 consists of a memory module including one or more memory elements providing 1 MByte of memory, for example Random Access Memory (RAM). However, it will be appreciated that the present invention is not limited to memory modules, and it is contemplated that the invention may equally be implemented in relation to any type of IC module capable of functioning alone or as part of a multi-module implementation, such as, for example, replicated logic circuits, processing blocks, etc.

Each replicated IC module 110 includes one or more inter-module cross-wafer electrical connection(s) 120, 125 spanning one or more scribe and edge seal boundary(ies) of the replicated IC module 110, and coupling the replicated IC module 110 to least one further replicated IC module 110. In the example illustrated in FIG. 1, the replicated IC modules 110 are arranged into a two dimensional array layout within the semiconductor wafer 100, the two dimensional array consisting of 4×4 replicated IC modules 110. Accordingly, in the illustrated example the semiconductor wafer 100 includes sixteen replicated IC modules 110. However, it will be appreciated that in other examples the semiconductor wafer 100 may include any number of replicated IC modules 110, depending on the size and density of the IC modules within the semiconductor wafer 100, and may be arranged in any suitable manner within the semiconductor wafer 100. In particular, it is contemplated that the invention is not limited to the semiconductor wafer 100 consisting of replicated IC modules 110 arranged in a symmetric (e.g. n×n) two dimensional array layout, and in some examples it is contemplated that the replicated modules 110 may be arranged into, for example, an n×m array layout, where n is greater than or equal to 1. Furthermore, although sixteen replicated IC modules are illustrated in FIG. 1, it will be appreciated that this number of replicated IC modules 110 is not intended to be limiting, and that in alternative examples of the present invention the semiconductor wafer 100 may include fewer or more replicated IC modules 110, and in some examples may include significantly more replicated IC modules 110, for example numbering in the hundreds or even thousands.

Figure 2:
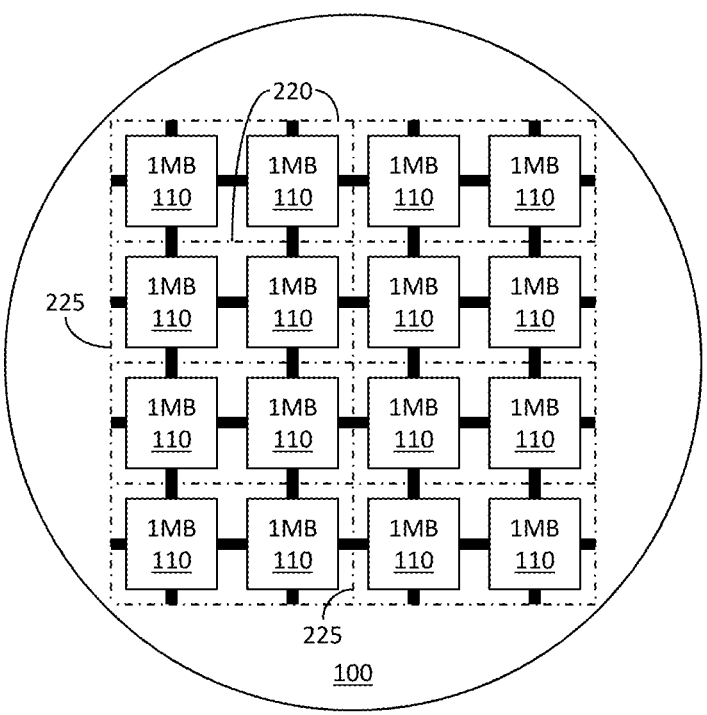
FIGS. 2 and 3 illustrated examples of scribe lines along which the semiconductor wafer of FIG. 1 may be cut to create IC dies consisting of different configurations of replicated IC modules.
Figure 3:
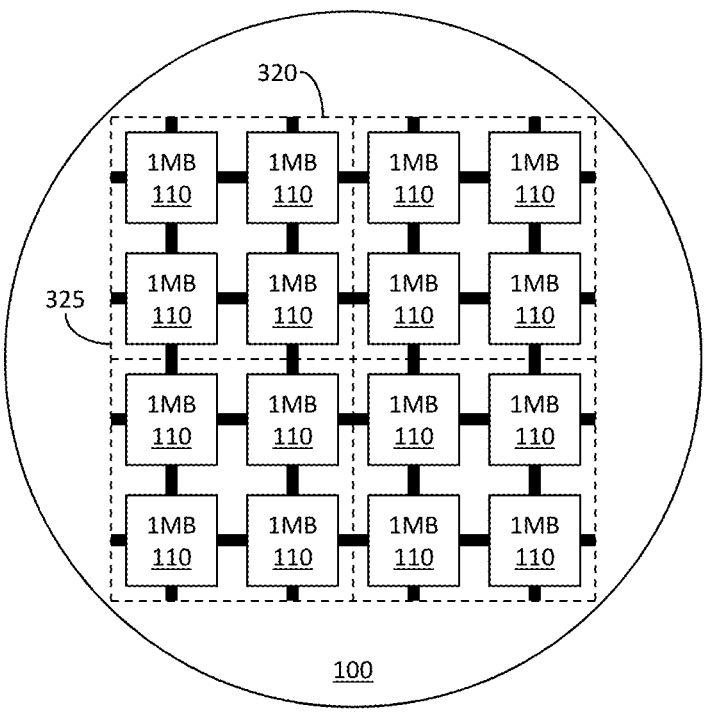

In the example illustrated in FIG. 1, inter-module cross-wafer electrical connections 120, 125 are provided between each pair of adjacent replicated IC modules 110 within the array layout. In this manner, IC dies consisting of different configurations of the replicated IC modules 110 may be created from the semiconductor wafer 100 based on where the semiconductor wafer 100 is cut (sawn). For example, FIG. 2 illustrates scribe lines 220, 225 along which the semiconductor wafer 100 may be cut to create IC dies consisting of two replicated IC modules 110. In this manner, eight IC dies, each consisting of 2 Mbytes of memory, may be created from the semiconductor wafer 100. FIG. 3 illustrates alternative scribe lines 320, 325 along which the semiconductor wafer 100 may be cut to create IC dies consisting of four replicated IC modules 110. In this manner, four IC dies, each consisting of four Mbytes of memory, may be created from the semiconductor wafer 100. It will be appreciated that IC dies consisting of still further configurations may be created from the semiconductor wafer 100. For example, a single IC die consisting of all sixteen replicated IC modules 110 may be created, consisting of 16 Mbytes of memory. Alternatively, sixteen IC dies may be created, each consisting of just a single replicated IC module consisting of 1 Mbyte of memory. It is further contemplated that the semiconductor wafer 110 need not be cut into IC dies of a uniform size and configuration. For example, a mixture of IC die configurations may be created from the semiconductor wafer 100, such as, for example, four IC dies each consisting of two of the replicated IC modules 110 (such as those illustrated in FIG. 2) and two IC dies each consisting of four of the replicated IC modules 110 (such as those illustrated in FIG. 3).

In the illustrated examples, each replicated IC module 110 has four inter-module cross-wafer electrical connections 120, 125 spanning scribe and edge seal boundaries on each side of the replicated IC module 110. In this manner, and as illustrated in FIGS. 1 to 3, each non-peripheral replicated IC module 110 is coupled to adjacent replicated IC modules 110 on all four sides thereof within the two-dimensional array structure. As also illustrated in FIGS. 1 to 3, those replicated IC modules 110 located at the periphery of the two-dimensional array structure may also be provided within cross-wafer electrical connections spanning their scribe and edge seal boundaries facing outward of the array structure (for example due to the same silicon mask being used for replicated IC modules 110 located at the periphery of the array structure as at the centre of the array structure), even though they do not connect to another replicated IC module 110.

Each inter-module cross-wafer electrical connection 120, 125 is arranged to convey electrical signals between two or more replicated IC modules 110. The individual inter-module cross-wafer electrical connections 120, 125 are not limited to a single electrical connection, and may consist of any required number of electrical connections for implementing any required functionality and/or inter-module communication. For example, as previously identified, the replicated IC modules 110 in the illustrated example consist of memory modules. As such, the inter-module cross-wafer electrical connections 120, 125 may be arranged to provide cross-wafer memory expansion interfaces capable of providing a means of requesting access to memory mapped resources between replicated IC modules 110. One example of such a memory expansion interface that may be provided by way of an inter-module cross-wafer electrical connection 120, 125 is an external bus interface with address, data and control signals.

Figure 4:
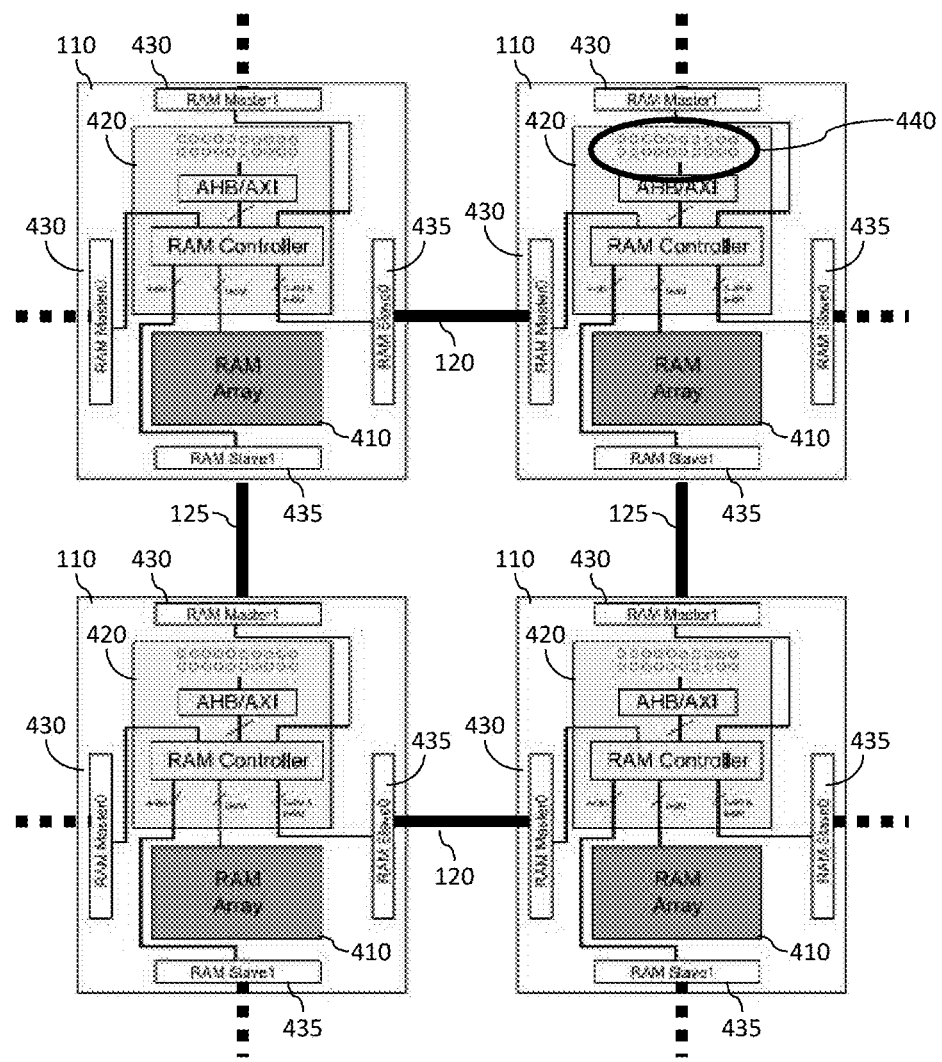
FIG. 4 illustrates a simplified block diagram of an example of replicated IC modules of FIGS. 1 to 3 in greater detail.

FIG. 4 illustrates a simplified block diagram of an example of the replicated IC modules 110 of FIGS. 1 to 3 in greater detail. Each replicated IC module 110 includes functional circuitry, which in the illustrated example consists of an array of memory (RAM) 410 and a memory controller 420. Each replicated IC module 110 further includes a memory expansion interface port on each side thereof, and to which inter-module cross-wafer electrical connections 120, 125 are coupled to provide cross-wafer memory expansion interfaces between adjacent replicated IC modules 110.

In some examples, it is contemplated that inter-module cross-wafer electrical connections may be provided on first sides of each replicated IC module along a first orientation and a second orientation, for example a 'top' side (first side of 'y-axis' orientation) and 'left-hand' side (a first side of 'x-axis' orientation), that are arranged to 'push' accesses to memory mapped resources within adjacent replicated IC modules coupled thereto. Conversely, in such examples it is contemplated that inter-module cross-wafer electrical connections may be provided on second sides of each replicated IC module along the first and second orientations, for example a 'bottom' side (second side of 'y-axis' orientation) and 'right-hand' side (a second side of 'x-axis' orientation), that are arranged to receive accesses to memory mapped resources from adjacent replicated IC modules coupled thereto.

For example, and as illustrated in FIG. 4, the top and left-hand sides (from the perspective of the illustrated plan view) of each replicated IC module 110 are master memory expansion interface ports 430, whilst the bottom and right-hand sides (from the perspective of the illustrated plan view) of each replicated IC module 110 are slave memory expansion interface ports 435.

In addition to the inter-module cross-wafer electrical connections 120, 125, it is contemplated that each replicated IC module 110 may further include one or more external interface connection. For example, such an external interface connection may consist of a System-in-Package (SiP) interface for connecting the replicated IC module 110 to one or more co-packaged IC dies using, for example, bonding wires, copper pillars or solder bumps (e.g., for use in a stacked die arrangement), etc. In the example illustrated in FIG. 4, the replicated IC modules 110 include an SiP interface port, such as the SiP interface port circled at 440 for one of the replicated IC modules 110 illustrated in FIG. 4, the SiP interface ports 440 including, for example, an array of contacts with which each of the replicated IC modules is capable of establishing an inter-die connection (e.g. by way of copper pillars or solder bumps) with an external device, for example such as located within a co-packed IC die on which the replicated IC module 110 is stacked.

Advantageously, because inter-module cross-wafer electrical connections 120, 125 are provided between the replicated IC modules 110, only one replicated IC module 110 is required to establish a physical connection with, for example, a system-on-chip (SoC) or other external device (not shown) with which the replicated IC modules 110 are required to communicate. All other replicated IC modules 110 within the IC die containing the replicated IC modules 110 are able to communicate with the SoC (or other external device) via the one replicated IC module 110 physically connected thereto by way of the inter-module cross-wafer electrical connections 120, 125. This reduces the number of interface connections the external device is required to provide to communicate with the replicated IC modules 110, and thus can remove restrictions on the physical size of the external device, especially when used in an SiP configuration.

In order to enable an external device such as an SoC to access the resources within a replicated IC module 110 not directly connected thereto, a means of addressing the individual replicated IC modules 110 is required. However, standard addressing schemes cannot be used because they require individual select lines to be routed to each mapped resource, or each resource to be customised to respond to a unique address range. These approaches will not work for addressing the individual replicated IC modules 110 of the present invention, since the semiconductor wafer can be cut at arbitrary sections to produce IC dies consisting of arbitrary replicated IC module configurations.

To overcome this problem, embodiments of the present invention provide an addressing and decoding scheme that allows an external bus master device to access any memory mapped resource within an array of replicated IC modules 110. The addressing and decoding scheme does not require any programming or customisation of any of the replicated IC modules 110, and does not constrain the size of the replicated IC module array. This will enable a semiconductor wafer of replicated IC modules 110 to be cut and packaged into arbitrarily sized arrays to flexibly meet application needs. The proposed addressing scheme and decoding mechanism is based on the use of relative addressing, where the resource address is modified as it is forwarded through the array of replicated IC modules 110.

In accordance with examples of the present invention there is provided an IC module, such as a replicated IC module 110 hereinbefore described, consisting of at least one memory mapped resource, at least one port arranged to be coupled to at least one further IC module, and at least one address decoding component. Upon receipt of a resource access request by the IC module, the address decoding component is arranged to extract one or more position parameter(s) from an address field of the received resource access request, determine if the position parameter(s) indicates a target resource as residing within the IC module, and if it is determined that the position parameter indicate(s) the target resource as not residing within the IC module, modify the position parameter(s) to represent a change of one position and forward the resource access request with the modified position parameter(s) over the port to the further IC module coupled thereto.

Figure 5:
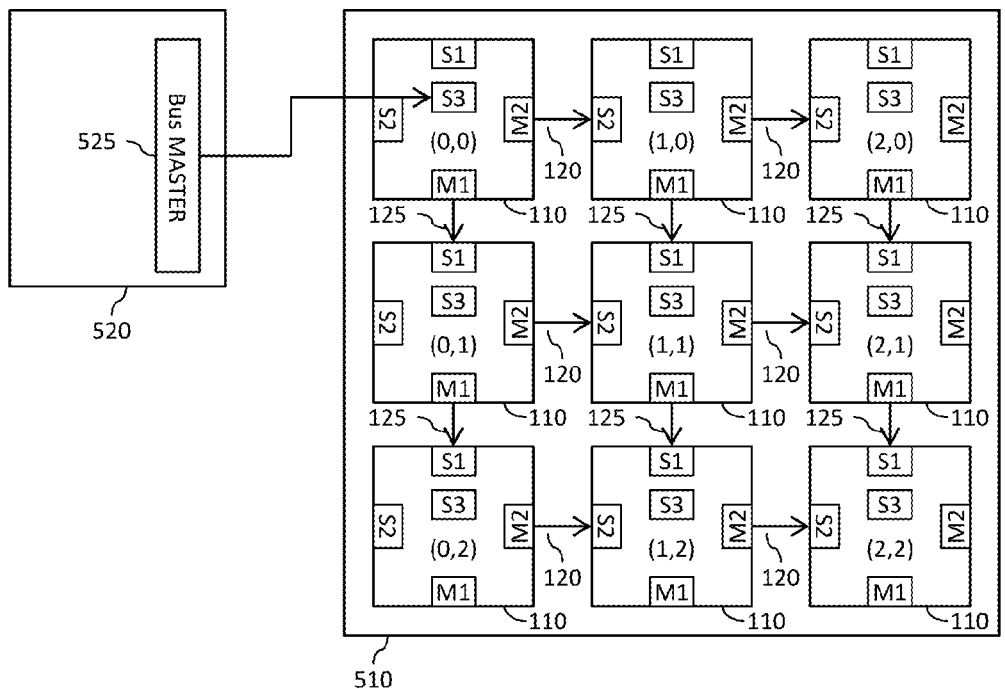
FIGS. 5 and 7 schematically illustrate an example of an addressing scheme and decoding mechanism for multiple replicated IC modules arranged in a two-dimensional array structure.
Figure 6:
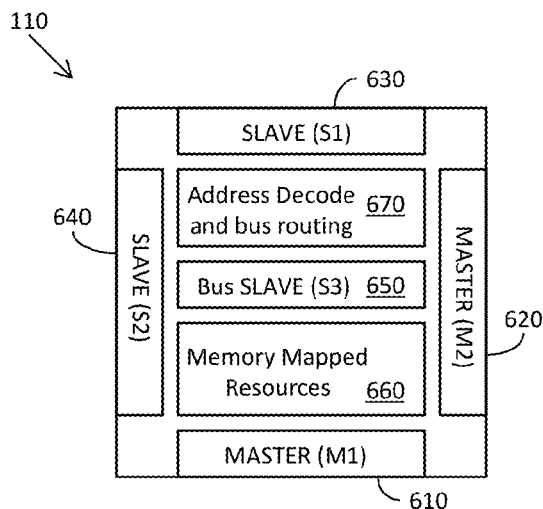
FIGS. 6 and 8 illustrate simplified block diagrams of examples of a replicated IC module within the two-dimensional array structure of FIGS. 5 and 7.

FIG. 5 schematically illustrates an example of the proposed addressing scheme and decoding mechanism for multiple replicated IC modules 110 arranged in a two-dimensional array structure. In the example illustrated in FIG. 5, a first IC die 510 consists of the two-dimensional array of replicated IC modules 110. FIG. 6 illustrates a simplified block diagram of an example of a replicated IC module 110 within the two-dimensional array of FIG. 5. In the illustrated example, each replicated IC module 110 includes a bus interface port on each of its four sides arranged to be coupled to adjacent replicated IC modules 110 within the two-dimensional array. Two of the bus interfaces (M1 and M2) 610, 620 on each replicated IC module 110 are master bus ports arranged to generate resource access requests, whilst the other two bus interfaces (S1 and S2) 630, 640 on each replicated IC module 110 are slave ports arranged to respond to resource access requests. Inter-module cross-wafer electrical connections 120, 125 couple adjacent master and slave ports on neighbouring replicated IC modules 110, as illustrated in FIG. 5. Each replicated IC module 110 further includes an external interface connection (S3) 650 consisting of a bus slave connection arranged to be connected to an external (i.e. off-die) bus master. In the example illustrated in FIG. 5, only the top left replicated IC module 110 (from the perspective of the illustrated plan view) is connected to an external bus master 525 located on a second IC die 520, for example by way of bonding wires, copper pillars or some other die to die interconnect technology.

Figure 7:
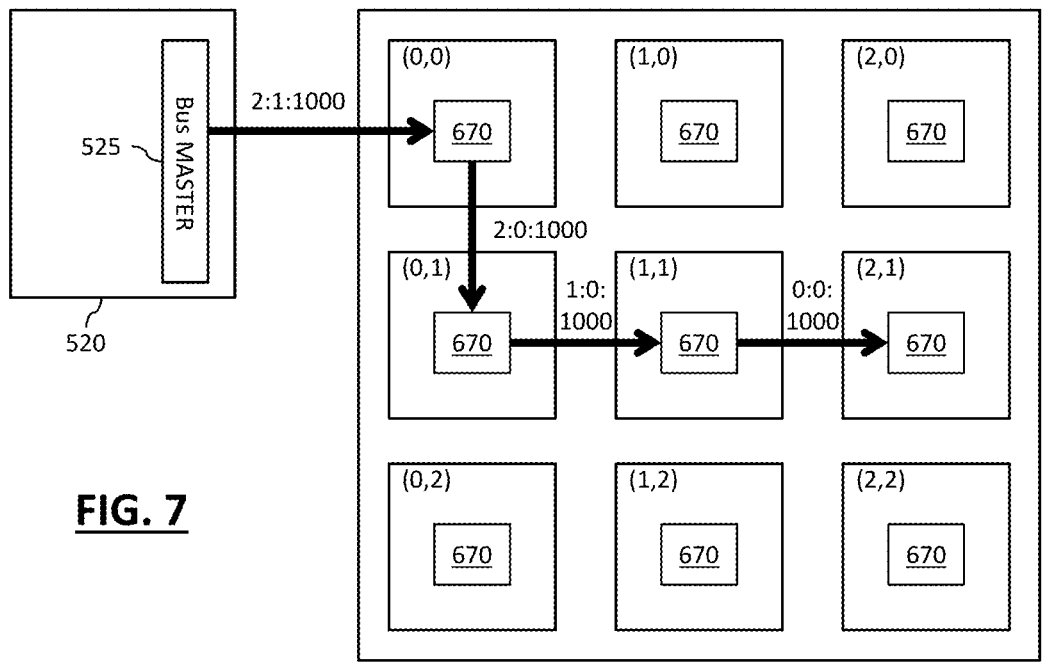

The external master 525 is able to access any resource in the replicated IC module array using an address field including one or more replicated IC module position parameter(s) and a local address parameter of the targeted resource within a replicated IC module. In the illustrated example, the address field includes position parameters x and y that identify which replicated IC module 110 in the array is being addressed, and a local address parameter n that represents the local address of the targeted resource within a replicated IC module 110. For example, and as illustrated in FIG. 7, when the external master 525 wishes to access (e.g. read from or write to) a resource with local address 1000 within the replicated IC module 110 identified as (2, 1) in FIGS. 5 and 7, the external master 525 generates a resource access request having address (x, y, n)=(2, 1, 1000). The resource access request may then be forwarded through a sequence of replicated IC modules 110 to the target replicated IC module 110 (2,1), each replicated IC module 110 in the sequence updating the address in accordance with the direction in which it forwards the resource access request. For example, the external master 525 sends the resource access request to the external slave port connection S3 of the replicated IC module 110 (0, 0). The replicated IC module 110 (0, 0) may then decrement, for example, the y address value, and forward the resource access request over its y-axis master port (M1) 610 to the replicated IC module 110 (0, 1). The updated address of the resource access request received by the replicated IC module 110 (0, 1) will be (x, y, n)=(2, 0, 1000), the '0' y value indicating that the target replicated IC module 110 (2, 1) is on that row of the array of replicated IC modules 110. Accordingly, replicated IC module 110 (0, 1) may then decrement the x address value, and forward the resource access request over its x-axis master port (M2) 620 to the replicated IC module 110 (1, 1). In this manner the resource access request may be forwarded through a sequence of replicated IC modules 110 until it reaches its target replicated IC module 110, at which point the resource access request will have the address (x, y, n)=(0, 0, 1000). The target replicated IC module 110, which in this example will be the target replicated IC module (2, 1), is then able to use the local address component (1000) to access the specified resource within the memory mapped resources 660 of the target replicated IC module (2, 1), and provide any required response, which may be forward back to external master 525 through, for example, the reverse sequence of replicated IC modules 110.

Such an example addressing scheme may be implemented within each replicated IC module 110 by way of a simple set of rules such as:

IF received access IC module identifier (x,y)=(0,0)
  //Addressed resource is on this IC module
  Use (n) to access targeted IC module resource at local address (n)
  Pass any response to bus SLAVE that resource access request was received through
ELSE IF y=0
  //Addressed resource is on a different IC module on same row
  x=x-1
  Forward request through x-axis MASTER bus (M2) with updated IC module identifier
  Pass any response to bus SLAVE that resource access request was received through
ELSE
  //Addressed resource is on a different IC module on a lower row
  y=y-1
  Forward request through y-axis MASTER bus (M1) with updated IC module identifier
  Pass any response to bus SLAVE that resource access request was received through
Notably, it is not critical which slave port a replicated IC module 110 returns a response over (as long as the slave port is 'active'—i.e. coupled to an adjacent replicated IC module 110), since the direction of all slave ports is back towards the replicated IC module (0,0) coupled to the external master 525.

Figure 8:
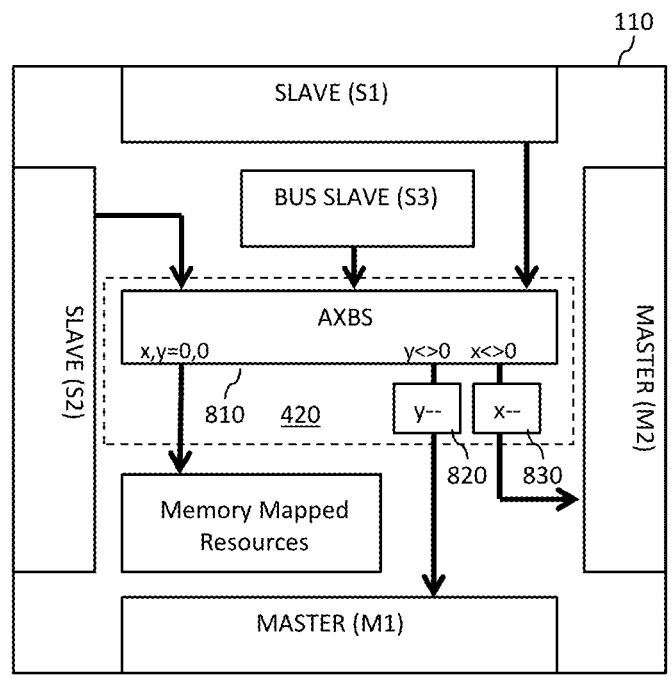

Such an addressing scheme may be implemented within an address decoding component 670 (FIG. 6) of each replicated IC module 110. Such an address decoding and bus routing component 670 (FIG. 6) may be provided within the RAM controller 420 of each of the replicated IC memory modules 110 illustrated in FIG. 4. Alternatively, and as illustrated in FIG. 8, such an address decoding component may be implemented using a bus interface or crossbar component 810. Hardware logic 820, 830 may be used to modify the IC module identifier fields (x, y) before any access is forwarded over a master port to a connected IC module 110.

Significantly, by implementing an addressing scheme using such a set of rules, no customisation of the replicated IC modules 110 is required (for example, no custom addresses have to be assigned to replicated IC modules 110 using custom metal layers, fuses, non volatile memory or other mechanisms). This avoids the need for custom processing of a the semiconductor wafer of replicated IC modules 110 to match any particular wafer cutting scheme or replicated IC modules 110 array size and shape. Furthermore, no configuration of the replicated IC module array is required on system start up (for example, there is no need to configure interconnects between replicated IC modules 110 or allocate replicated IC module addresses). This avoids any start up delay and reduces complexity of replicated IC modules 110 and any external configuration master. Further still, the simple addressing mechanism implementation and static inter-module cross-wafer interconnect structure of busses enables a low cost overhead.

Figure 9:
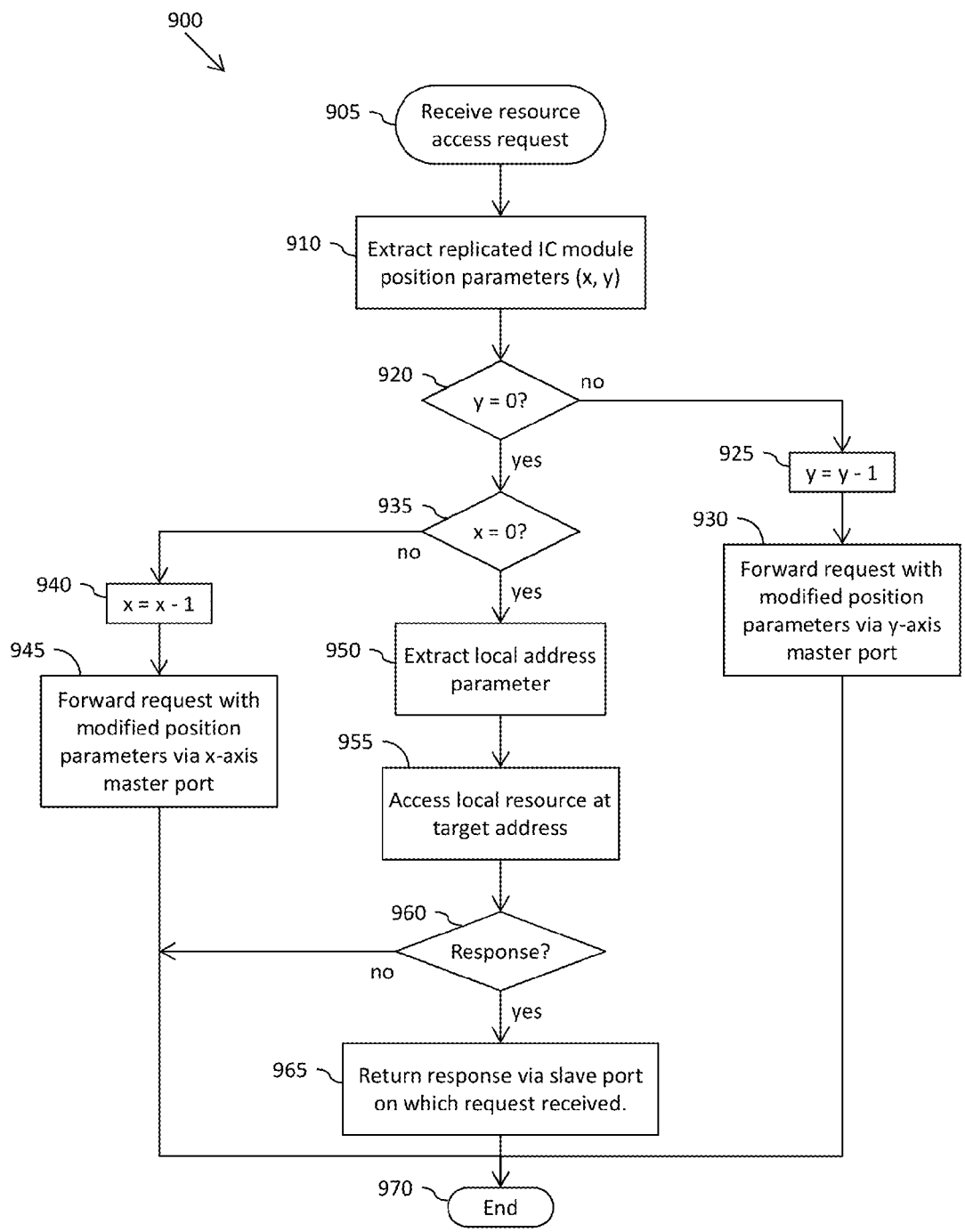
FIG. 9 illustrates a simplified flowchart of an example of a method of decoding resource access requests.

Referring now to FIG. 9, there is illustrated a simplified flowchart 900 of an example of a method of decoding resource access requests within an IC module, such as a replicated IC module hereinbefore described. The method starts at 905 with the receipt of a resource request access. For example, in FIGS. 5 and 6, such a resource access request may be received from an adjacent IC module 110 via an inter-module cross-wafer electrical connection 120, 125 at a slave port 630, 640, or from an external bus master 525 at an external slave port connection S3.

Position parameters are then extracted from an address field of the received resource access request, at 910. In the illustrated example, the IC module forms a part of a two dimensional array of IC modules, and a first dimension position parameter y and a second dimension position parameter x are extracted from the address field of the received resource access request.

It is then determined if the extracted position parameters indicate a target resource of the received resource access request as residing within the IC module.

In the illustrated example, it is first determined if the first dimension position parameter y indicates the target resource as residing within the current row of the array of IC modules (i.e. y=1), at 920.

If it is determined that the first dimension position parameter y indicates the target resource as not residing within the current row of the array of IC modules, the first dimension position parameter y is modified to represent a change of one row, which in the illustrated example consists of incrementing the first dimension position parameter y by '1' at 925. The resource access request is then forwarded with the modified first dimension position parameter y over a y-axis master port to an IC module within a successive row of the array of IC modules, at 930. The method then ends, at 970.

If it is determined that the first dimension position parameter y indicates the target resource as residing within the current row of the array of IC modules, it is then determined if the second dimension position parameter x indicates the target resource as residing within the current column of the array of IC modules (i.e. x=0), at 935.

If it is determined that the second dimension position parameter x indicates the target resource as not residing within the current column of the array of IC modules, the second dimension position parameter x is modified to represent a change of one column, which in the illustrated example consists of incrementing the second dimension position parameter x by '1' at 940. The resource access request is then forwarded with the modified second dimension position parameter x over an x-axis master port to an IC module within a successive column of the array of IC modules, at 945. The method then ends, at 970.

Thus, if it is determined that the position parameters indicate the target resource as not residing within the IC module (i.e. either y≠0 or x≠0 in the illustrated example), the position parameters are modified to represent a change of one position and the resource access request is forwarded with the modified position parameters to a next successive IC module with the array.

However, if it is determined that the position parameters indicate the target resource as residing within the IC module (i.e. y=0 and x=0 in the illustrated example), the method moves on to 950 where a local address parameter is extracted from the address field of the received resource access request. A local resource of the IC module corresponding to the extracted local address parameter is then accessed, at 955.

If it is determined that the requested resource access requires a response, at 960, the method moves on to 965, where an appropriate response returned via the slave port on which the resource access request was received, and the method ends at 970.

In the examples hereinbefore described with reference to the accompanying drawings, the IC modules 110 have been arranged in two-dimensional arrays, with the conventional terms for 'horizontal' and 'vertical' lines of 'rows' and 'columns' being used to describe the layout of IC modules 110 within such arrays. However, it will be appreciated that the use of such terms is not intended to be limiting, and references to rows and columns are to be understood as being reversible. For example, in the method illustrated in FIG. 9 it is first determined if the first dimension position parameter y indicates the target resource as residing within the current row of the array of IC modules (i.e. y=1), at 920, and subsequently determined if the second dimension position parameter x indicates the target resource as residing within the current column of the array of IC modules (i.e. x=1). However, it is contemplated that the order of such determinations may be reversed such that it is first determined if the position parameters indicate the target resource as residing within the current column of the array of IC modules, and subsequently determined if the position parameters indicate the target resource as residing within the current row of the array of IC modules.

Furthermore, it is contemplated that the present invention is not limited to IC modules being arranged in two dimensional arrays, and any suitable alternative layout of IC modules may equally be used, for example one or more one-dimensional array(s).

In the examples hereinbefore described with reference to the accompanying drawings, the modification of a position parameter to represent a change of one position has been described as consisting of incrementing the position parameter. However, it will be appreciated that the present invention is not limited to incrementing the position parameter to represent a change of one position, and any suitable alternative operation may be performed on the position parameter. For example, the position parameter may be decremented to represent a change of one position. Alternatively, a shift operation may be performed on the position parameter to represent a change of one position, such a shift operation being simpler to implement but requiring a larger number of address lines to implement the position parameter than for an incremental or decremental operation.

In the examples hereinbefore described with reference to the accompanying drawings, the present invention has been described with reference to replicated IC modules. However, it will be appreciated that the present invention is not limited to being implemented within replicated IC modules, and may equally be implemented within non-replicated IC modules. Furthermore, and as previously mentioned, the present invention is not limited to IC memory modules, and in some examples it is contemplated that the IC modules may include alternative types of functionality capable of being memory mapped, including memory (e.g. RAM, non-volatile memory, etc.), logic circuits, peripheral devices, processing blocks, etc.

As will be appreciated by a skilled person, the present invention enables the flexible fabrication of IC dies consisting of variable IC module configurations that may be connected to external devices, such as an SoC using SiP technology, via just a single external interface connection between the IC die containing the IC module(s) and the IC die containing the external device, whilst enabling access to resources provided by all of the repeatable IC modules. Furthermore, the present invention provides an addressing and decoding scheme that allows an external bus master device to access any memory mapped resource within an array of IC modules that does not require any programming or customisation of any of the IC modules 110, and does not constrain the size of the IC module array. This will enable a semiconductor wafer of IC modules to be cut and packaged into arbitrarily sized arrays to flexibly meet application needs.

Figure 10:
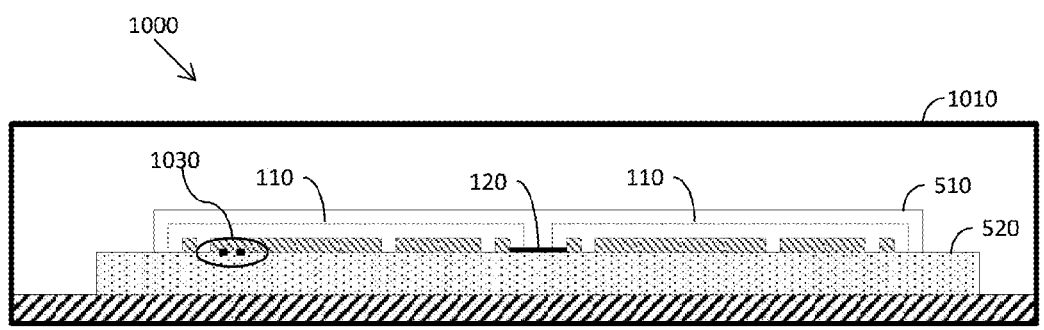
FIG. 10 schematically illustrates a cross-sectional view of an IC device.

FIG. 10 schematically illustrates a cross-sectional view of an IC device 1000 containing the IC die 510 cut from the semiconductor wafer 100 located within an IC package 1010. In the example illustrated in FIG. 10, the IC die 510 consists of two replicated IC modules 110 coupled together by an inter-module cross-wafer electrical connection 120. The IC die 510 is mounted on a second IC die 520, for example consisting of an SoC, and an external interface connection of one of the replicated IC modules 110 is connected to, for example, an external bus master located on the second IC die 520, for example by way of copper pillars circled at 1030. Thus, in the example illustrated in FIG. 10, the IC die 510 consisting of the replicated IC modules 110 is co-located within the same IC device package 1010 as the second IC die 520 to which the replicated IC modules 110 are connected. However, in some alternative examples it is contemplated that the IC die 510 consisting of the replicated IC modules 110 may alternatively be located within a separate IC device package to the second IC die 520, whereby an external interface connection of one (or more) of the replicated IC modules 110 is connected to the second IC die 520 via package pins and printed circuit board (PCB) routing.

In the foregoing specification, the invention has been described with reference to specific examples of embodiments of the invention. The illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

It will, however, be evident that various modifications and changes may be made therein without departing from the scope of the invention as set forth in the appended claims and that the claims are not limited to the specific examples described above.

For example, the semiconductor wafer 100 described herein may consist of a substrate made from any semiconductor material or combinations of materials, such as gallium arsenide, silicon germanium, silicon-on-insulator (SOI), silicon, monocrystalline silicon, the like, and combinations of the above.

Moreover, the terms 'front,' 'back,' 'top,' 'bottom,' 'over,' 'under' and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit, IC, module comprising:
at least one memory mapped resource;
at least one port arranged to be coupled to at least one further IC module; and
at least one address decoding component,
wherein, upon receipt of a resource access request by the IC module, the at least one address decoding component is arranged to:
extract at least one position parameter from an address field of the received resource access request,
determine if the at least one position parameter indicates a target resource as residing within the IC module, and
if it is determined that the at least one position parameter indicates the target resource as not residing within the IC module, modify the at least one position parameter to represent a change of one position and forward the resource access request with the modified at least one position parameter over the at least one port to the at least one further IC module, wherein the IC module forms a part of a two dimensional array of IC modules, and the at least one address decoding component is arranged to extract a first dimension position parameter y and a second dimension position parameter x.

2. The IC module of claim 1, wherein, upon receipt of the resource access request by the IC module, the at least one address decoding component is arranged to:
   determine if the first dimension position parameter y indicates the target resource as residing within the current row of the array of IC modules, and
   if it is determined that the first dimension position parameter y indicates the target resource as not residing within the current row of the array of IC modules, modify the first dimension position parameter y to represent a change of one row and forward the resource access request with the modified first dimension position parameter y over the at least one port to a IC module within a successive row of the array of IC modules.

3. The IC module of claim 2, wherein if it is determined that the at least one first dimension position parameter y indicates the target resource as residing within the current row of the array of IC modules, the at least one address decoding component is arranged to:
   determine if the second dimension position parameter x indicates the target resource as residing within the current column of the array of IC modules, and
   if it is determined that the second dimension position parameter x indicates the target resource as not residing within the current column of the array of IC modules, modify the second dimension position parameter x to represent a change of one column and forward the resource access request with the modified second dimension position parameter x over the at least one port to a IC module within a successive column of the array of IC modules.

4. The IC module of claim 1 comprising:
   a first slave port arranged to be coupled to a master port of a further IC module in a preceding row of the two dimensional array of IC modules, and to receive resource access requests therefrom,
   a second slave port arranged to be coupled to a master port of a further IC module in a preceding column of the two dimensional array of IC modules, and to receive resource access requests therefrom,
   a first master port arranged to be coupled to a slave port of a further IC module in a succeeding row of the two dimensional array of IC modules, and arranged to forward resource access requests thereto, and
   a second master port arranged to be coupled to a slave port of a further IC module in a succeeding column of the two dimensional array of IC modules, and arranged to forward resource access requests thereto.

5. The IC module of claim 1, wherein, if the at least one address decoding component determines that the at least one position parameter indicates the target resource as residing within the IC module, the address decoding component is further arranged to extract a local address parameter from the address field of the received resource access request and access a local resource of the IC module corresponding to the extracted local address parameter.

6. The IC module of claim 1 further comprising at least one external interface connection arranged to be coupled to an off-die bus master.

7. The IC module of claim 1, wherein the address decoding component is implemented within a bus interface component of the IC module.

8. The IC module of claim 1, wherein the at least one memory mapped resource comprises at least one of:
   a memory module,
   a logic circuit, and
   a processing block.

9. An integrated circuit, IC, device comprising at least one IC die, the at least one IC die comprises a two dimensional array of a plurality of IC modules, each IC module comprising:
   at least one memory mapped resource;
   at least one port arranged to be coupled to at least one further IC module; and
   at least one address decoding component, the at least one address decoding component of each IC module is arranged to extract a first dimension position parameter y and a second dimension position parameter x,
   wherein, upon receipt of a resource access request by the IC module, the at least one address decoding component is arranged to:
      extract at least one position parameter from an address field of the received resource access request,
      determine if the at least one position parameter indicates a target resource as residing within the IC module, and
      if it is determined that the at least one position parameter indicates the target resource as not residing within the IC module, modify the at least one position parameter to represent a change of one position and forward the resource access request with the modified at least one position parameter over the at least one port to the at least one further IC module.

10. The IC device of claim 9, wherein, upon receipt of the resource access request by an IC module, the at least one address decoding component of said IC module is arranged to:
   determine if the first dimension position parameter y indicates the target resource as residing within the current row of the array of IC modules, and
   if it is determined that the first dimension position parameter y indicates the target resource as not residing within the current row of the array of IC modules, modify the first dimension position parameter y to represent a change of one row and forward the resource access request with the modified first dimension position parameter y over the at least one port to a IC module within a successive row of the array of IC modules.

11. The IC device of claim 10, wherein if it is determined that the at least one first dimension position parameter y indicates the target resource as residing within the current row of the array of IC modules, the at least one address decoding component is arranged to:
   determine if the second dimension position parameter x indicates the target resource as residing within the current column of the array of IC modules, and
   if it is determined that the second dimension position parameter x indicates the target resource as not residing within the current column of the array of IC modules, modify the second dimension position parameter x to represent a change of one column and forward the resource access request with the modified second dimension position parameter x over the at least one port to a IC module within a successive column of the array of IC modules.

12. The IC device of claim 9, wherein each IC module comprises:
   a first slave port arranged to be coupled to a master port of a further IC module in a preceding row of the two dimensional array of IC modules, and to receive resource access requests therefrom, a second slave port arranged to be coupled to a master port of a further IC module in a preceding column of the two dimensional array of IC modules, and to receive resource access requests therefrom, a first master port arranged to be coupled to a slave port of a further IC module in a succeeding row of the two dimensional array of IC modules, and arranged to forward resource access requests thereto, and a second master port arranged to be coupled to a slave port of a further IC module in a succeeding column of the two dimensional array of IC modules, and arranged to forward resource access requests thereto.

13. The IC device of claim 9, wherein if the at least one address decoding component determines that the at least one position parameter indicates the target resource as residing within the IC module, the at least one address decoding component is further arranged to extract a local address parameter from the address field of the received resource access request and access a local resource of the IC module corresponding to the extracted local address parameter.

14. The IC device of claim 9, wherein at least one of the IC modules further comprises at least one external interface connection arranged to be coupled to an off-die bus master.

15. The IC device of claim 9, wherein the address decoding component of each IC module is implemented within a bus interface component of the IC module.

16. The IC device of claim 9, wherein the at least one memory mapped resource of each IC module comprises at least one of:
   a memory module,
   a logic circuit, and
   a processing block.

17. A method of decoding resource access requests within an integrated circuit, IC, module, wherein the IC module forms a part of a two-dimensional array of IC modules, the method comprising:
   receiving a resource access request;
   extracting at least one position parameter from an address field of the received resource access request, wherein the extracting at least one position parameter from the address field of the received resource access request comprises extracting a first dimension position parameter y and a second dimension position parameter x;
   determining if the at least one position parameter indicates a target resource as residing within the IC module; and
   if it is determined that the at least one position parameter indicates the target resource as not residing within the IC module, modifying the at least one position parameter to represent a change of one position and forwarding the resource access request with the modified at least one position parameter to at least one further IC module.

18. The method of claim 17, wherein if it is determined that the at least one position parameter indicates the target resource as residing within the IC module, the method further comprises extracting a local address parameter from the address field of the received resource access request and accessing a local resource of the IC module corresponding to the extracted local address parameter.

19. The method of claim 17, wherein determining if the at least one position parameter indicates a target resource as residing within the IC module comprises determining if the first dimension position parameter y indicates the target resource as residing within a current row of the two-dimensional array of IC modules, and wherein if it is determined that the first dimension position parameter y indicates the target resource as not residing within the current row of the two-dimensional array of IC modules, the method further comprises modifying the first dimension position parameter y to represent a change of one row and forwarding the resource access request with the modified first dimension position parameter y to an IC module within a successive row of the two-dimensional array of IC modules.

20. The method of claim 19, wherein if it is determined that the at least one first dimension position parameter y indicates the target resource as residing within the current row of the two-dimensional array of IC modules, the method further comprises determining if the second dimension position parameter x indicates the target resource as residing within a current column of the two-dimensional array of IC modules, and if it is determined that the second dimension position parameter x indicates the target resource as not residing within the current column of the two-dimensional array of IC modules, the method further comprises modifying the second dimension position parameter x to represent a change of one column and forwarding the resource access request with the modified second dimension position parameter x to an IC module within a successive column of the two-dimensional array of IC modules.

21. An integrated circuit ("IC") module comprising:
   a first port suitable for coupling to a second IC module; and
   an address decoding component,
   wherein, upon receipt of a resource access request by the IC module, the address decoding component is configured to:
      extract a first position parameter from an address field of the received resource access request,
      determine if the first position parameter indicates a target resource as residing within the IC module, and
      if it is determined that the first position parameter indicates the target resource as not residing within the IC module, modify the first position parameter to represent a change of one position and output the resource access request with the modified first position parameter from the first port, wherein the IC module forms a part of a two-dimensional array of IC modules, and the address decoding component is configured to extract a first dimension position parameter y and a second dimension position parameter x.

22. The IC module of claim 21, wherein the first dimension parameter y pertains to the first position parameter, wherein, upon receipt of the resource access request by the IC module, the address decoding component is configured to:
   determine if the first dimension position parameter y indicates the target resource as residing within a current row of the two-dimensional array of IC modules, and
   if it is determined that the first dimension position parameter y indicates the target resource as not residing within the current row of the two-dimensional array of IC modules, modify the first dimension position parameter y to represent a change of one row and forward the resource access request with the modified first dimension position parameter y over the first port to the second IC module within a successive row of the two-dimensional array of IC modules.

23. The IC module of claim 22, wherein if it is determined that the first dimension position parameter y indicates the target resource as residing within the current row of the two-dimensional array of IC modules, the address decoding component is configured to:
- determine if the second dimension position parameter x indicates the target resource as residing within a current column of the two-dimensional array of IC modules, and
- if it is determined that the second dimension position parameter x indicates the target resource as not residing within the current column of the two-dimensional array of IC modules, modify the second dimension position parameter x to represent a change of one column and forward the resource access request with the modified second dimension position parameter x over a second port to a third IC module within a successive column of the two-dimensional array of IC modules.

24. An integrated circuit ("IC") module comprising:
a first port suitable for coupling to a second IC module;
an address decoding component, wherein, upon receipt of a resource access request by the IC module, the address decoding component is configured to:
- extract a first position parameter from an address field of the received resource access request,
- determine if the first position parameter indicates a target resource as residing within the IC module, and
- if it is determined that the first position parameter indicates the target resource as not residing within the IC module, modify the first position parameter to represent a change of one position and output the resource access request with the modified first position parameter from the first port; and a second port suitable for coupling to a third IC module, wherein if it is determined that the first position parameter indicates the target resource as residing within the IC module, the address decoding component is configured to:
- extract a second position parameter from the address field of the received resource access request,
- determine if the second position parameter indicates the target resource as residing within the IC module, and
- if it is determined that the second position parameter indicates the target resource as not residing within the IC module, modify the second position parameter to represent a change of one position and output the resource access request with the modified second position parameter from the second port.

25. The IC module of claim 24, wherein the IC module forms a part of a two-dimensional array of IC modules that includes the second and third IC modules.

* * * * *